(12) United States Patent
Shim et al.

(10) Patent No.: US 10,788,574 B2
(45) Date of Patent: Sep. 29, 2020

(54) LIDAR DEVICE AND LIDAR SYSTEM INCLUDING THE SAME

(71) Applicant: KOREA ELECTRONICS TECHNOLOGY INSTITUTE, Seongnam-si, Gyeonggi-do (KR)

(72) Inventors: Young Bo Shim, Seoul (KR); Yeon Kug Moon, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 259 days.

(21) Appl. No.: 15/809,966

(22) Filed: Nov. 10, 2017

(65) Prior Publication Data

US 2018/0335507 A1 Nov. 22, 2018

Related U.S. Application Data

(63) Continuation of application No. PCT/KR2017/005881, filed on Jun. 7, 2017.

(30) Foreign Application Priority Data

May 19, 2017 (KR) .......................... 10-2017-0062296

(51) Int. Cl.
*G01C 3/08* (2006.01)
*G01S 7/481* (2006.01)
(Continued)

(52) U.S. Cl.
CPC .......... *G01S 7/4817* (2013.01); *G01S 7/4812* (2013.01); *G01S 17/42* (2013.01); *G02B 17/08* (2013.01);
(Continued)

(58) Field of Classification Search
None
See application file for complete search history.

(56) References Cited

U.S. PATENT DOCUMENTS 4,916,536 A * 4/1990 Kerr ...................... G01S 7/4811
348/139
2006/0227317 A1 10/2006 Henderson et al.
(Continued)

FOREIGN PATENT DOCUMENTS

WO 2017-023107 A1 2/2017
WO WO-2017204459 A1 * 11/2017 ............. G01S 7/481

OTHER PUBLICATIONS

International Search Report of corresponding PCT Patent Application No. PCT/KR2017/005881—3 pages (dated Feb. 13, 2018).
(Continued)

*Primary Examiner* — Yuqing Xiao
*Assistant Examiner* — Amir J Askarian
(74) *Attorney, Agent, or Firm* — Knobbe, Martens, Olson & Bear, LLP (57) ABSTRACT

The described technology relates to a light detection and ranging (LIDAR) device. The LIDAR device can include a transmission unit configured to emit a first signal, a first lens unit configured to convert the first signal into parallel light, a reflection unit configured to adjust a direction of the converted first signal and a second lens unit configured to enable the first signal to have the same focal plane even when a reflection angle of the reflection unit changes. The LIDAR device can also include a third lens unit configured to convert the first signal passing through the second lens unit into parallel light, a fourth lens unit configured to increase an angle of the first signal passing through the third lens unit and a reception unit configured to receive a second signal reflected by an object after passing through the fourth lens unit.

9 Claims, 7 Drawing Sheets

(51) Int. Cl.
  *G01S 17/42* (2006.01)
  *G02B 17/08* (2006.01)
  *G02B 26/10* (2006.01)
  *G01S 17/10* (2020.01)
  *G01S 17/931* (2020.01)

(52) U.S. Cl.
  CPC ............ *G02B 26/105* (2013.01); *G01S 17/10* (2013.01); *G01S 17/931* (2020.01)

(56) References Cited

U.S. PATENT DOCUMENTS

| | | | |
|---|---|---|---|
| 2010/0033808 A1* | 2/2010 | Betchley | G02B 27/0087 359/359 |
| 2012/0097834 A1* | 4/2012 | Lin | G02B 13/0005 250/201.1 |
| 2012/0236379 A1 | 9/2012 | da Silva et al. | |
| 2015/0055078 A1* | 2/2015 | Johnstone | G02B 3/0081 349/200 |
| 2015/0282707 A1* | 10/2015 | Tanabe | A61B 3/102 351/206 |
| 2016/0084945 A1* | 3/2016 | Rodrigo | G01S 17/58 356/5.01 |
| 2016/0274222 A1* | 9/2016 | Yeun | G01S 17/89 |
| 2016/0282453 A1 | 9/2016 | Pennecot et al. | |
| 2016/0313553 A1* | 10/2016 | Song | G02B 26/101 |
| 2016/0317028 A1* | 11/2016 | Murata | A61B 3/102 |
| 2017/0328989 A1* | 11/2017 | Bartlett | G01S 7/4814 |
| 2018/0003803 A1* | 1/2018 | Kakani | G01S 7/4816 |
| 2018/0031367 A1* | 2/2018 | Smith | G02B 5/122 |
| 2018/0052234 A1* | 2/2018 | Upton | G01S 7/4812 |
| 2018/0167602 A1* | 6/2018 | Pacala | H04N 13/395 |

OTHER PUBLICATIONS

Written Opinion of corresponding PCT Patent Application No. PCT/KR2017/005881—5 pages (dated Feb. 13, 2018).

* cited by examiner

LIDAR DEVICE AND LIDAR SYSTEM INCLUDING THE SAME

CROSS-REFERENCE TO RELATED APPLICATION

This application is a continuation application, and claims the benefit under 35 U.S.C. §§ 120 and 365 of PCT Application No. PCT/KR2017/005881, filed on Jun. 7, 2017, which is hereby incorporated by reference. PCT/KR2017/005881 also claimed priority from Korean Patent Application No. 10-2017-0062296 filed on May 19, 2017, which is hereby incorporated by reference.

BACKGROUND

Field

The described technology generally relates to a light detection and ranging (LIDAR) device and an LIDAR system including the same.

Description of the Related Technology

An LIDAR device is one of remote detection devices that may emit light, e.g., a laser, toward an object, analyze light reflected by the object, and measure physical properties of the object, for example, a distance, a direction, a speed, a temperature, a material distribution, and a concentration. LIDAR may precisely measure physical properties of an object by using advantages of a laser that may generate pulse signals having a high energy density and a short period.

LIDAR is used in various fields such as 3D image acquisition, meteorological observation, speed or distance measurement of an object, and autonomous driving by using a laser light source having a specific wavelength or a laser light source capable of changing a wavelength thereof as a laser light source. For example, an LIDAR device is installed in an aircraft, a satellite, etc. and used to precisely analyze the atmosphere and precisely observe the global environment, and is also installed in a spacecraft and an exploration robot and used as a means for supplementing camera functions of, for example, measuring a distance to an object.

Also, simple LIDAR sensor techniques are becoming commercially available for remote measuring, vehicle speed trapping, etc. Recently, an LIDAR device is utilized as a laser scanner or a 3D image camera, and is used in a 3D reverse engineering tool or an unmanned vehicle.

Recently, an LIDAR device that recognizes spatial information according to 360 degree rotation is being developed. However, an LIDAR device according to mechanical rotation of a motor or the like has a limitation in that there are mechanical defects thereof such as abrasion and a gap, and thus the LIDAR device has difficulty in being applied to autonomous driving that is directly related to human life.

SUMMARY

One aspect is an LIDAR device applicable to a vehicle or a mobile device.

Another aspect is an LIDAR device and an LIDAR system with enhanced optical efficiency.

Another aspect is an LIDAR device with a small size, a light weight, and improved durability.

Another aspect is an LIDAR device configured to scan a space by using only an optical configuration without mechanical rotation.

Another aspect is an LIDAR device that includes a transmission unit configured to emit a first signal, which is an optical signal; a first lens unit configured to convert the first signal into parallel light; a reflection unit configured to adjust a direction of the converted first signal; a second lens unit configured to enable the first signal to have the same focal plane even when a reflection angle of the reflection unit changes; a third lens unit configured to convert the first signal passing through the second lens unit into parallel light; a fourth lens unit configured to increase an angle of the first signal passing through the third lens unit; and a reception unit configured to receive a second signal, which is light reflected by an object after passing through the fourth lens unit.

The first signal and the second signal may be parallel light between the reflection unit and the second lens unit and between the third lens unit and the object.

The second signal may have the same optical path as the first signal between the reflection unit and the fourth lens unit.

The LIDAR device may further include a fifth lens unit disposed between the reflection unit and the reception unit and configured to condense light on the reception unit.

The LIDAR device may further include a focusing lens positioned in the same focal plane.

The reflection unit may correct an optical aberration caused by a focal displacement between the same focal plane and the third lens unit.

The reflection unit may control adjustment of the reflection angle to correct the optical aberration.

The reflection unit may include a microelectromechanical systems (MEMS) mirror.

The first signal and the second signal may overlap in at least some regions.

The LIDAR device may further include an optical diffusing unit configured to control a beam size of the first signal between the reflection unit and the first lens.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings

DETAILED DESCRIPTION

While the invention is susceptible to various modifications and alternative forms, specific embodiments thereof are shown by way of example in the drawings and will be described in detail herein. It should be understood, however, that there is no intent to limit the invention to the particular forms disclosed, and on the contrary, the invention is to cover all modifications, equivalents, and alternatives falling within the spirit and scope of the invention.

Although the terms "first," "second," etc. may be used herein to describe various elements, these elements are not limited by these terms. These terms are only used to distinguish one element from another. For example, a first element could be termed a second element, and similarly, a second element could be termed a first element, without departing from the scope of the present invention. The term "and/or" includes any and all combinations of one or more of associated listed items.

It should be understood that when an element is referred to as being "connected" or "coupled" to another element, the element can be directly connected or coupled to the other element, or intervening elements may be present. Conversely, when an element is referred to as being "directly connected" or "directly coupled" to another element, there are no intervening elements present.

The terminology used herein is only for the purpose of describing particular embodiments and is not intended to be limiting to the invention. As used herein, the singular forms "a," "an," and "the" are intended to include the plural forms as well unless the context clearly indicates otherwise. It should be further understood that the terms "comprises," "comprising," "includes," "including," and/or "having," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It should be further understood that terms, e.g., those defined in commonly used dictionaries, should be interpreted as having meanings that are consistent with their meanings in the context of the relevant art, and are not to be interpreted in an idealized or overly formal sense unless expressly so defined herein.

Hereinafter, example embodiments of the present invention will be described in detail with reference to the accompanying drawings. In the figures, the same reference numerals are used to denote the same elements throughout the drawings, and redundant descriptions thereof will be omitted.

Figure 1:
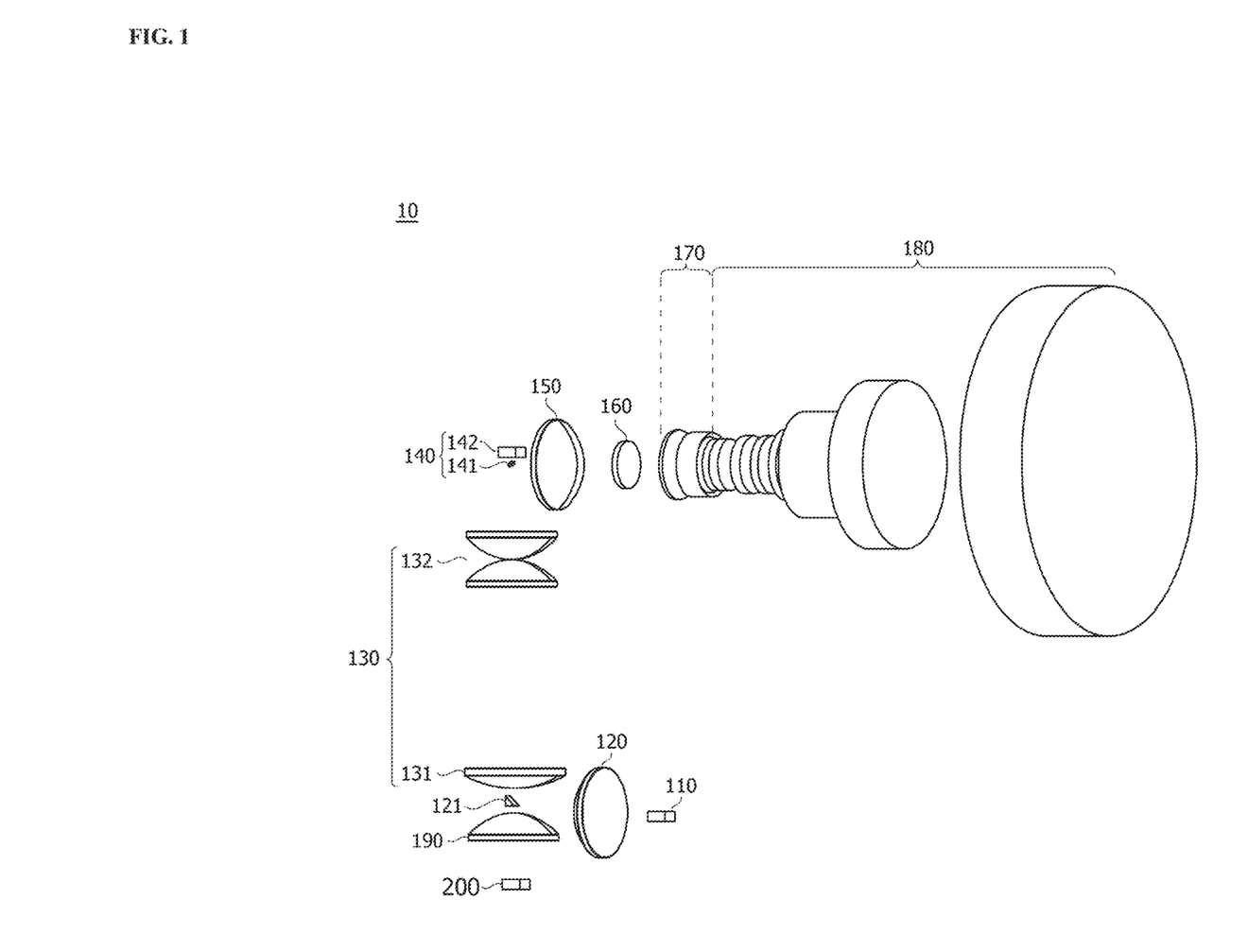
FIG. 1 is an exploded perspective view of an LIDAR device according to an embodiment.
Figure 2:
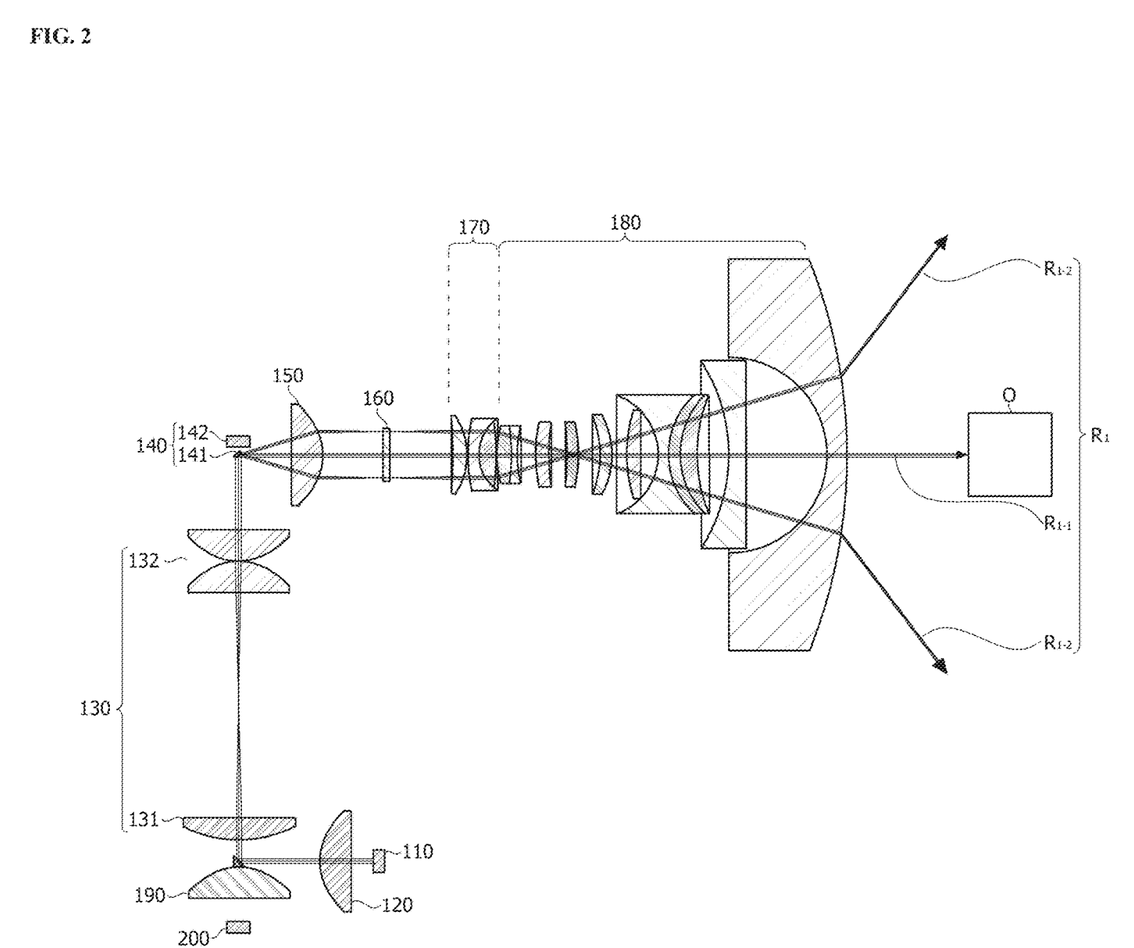
FIG. 2 is a cross-sectional view of an LIDAR device during transmission according to an embodiment.
Figure 3:
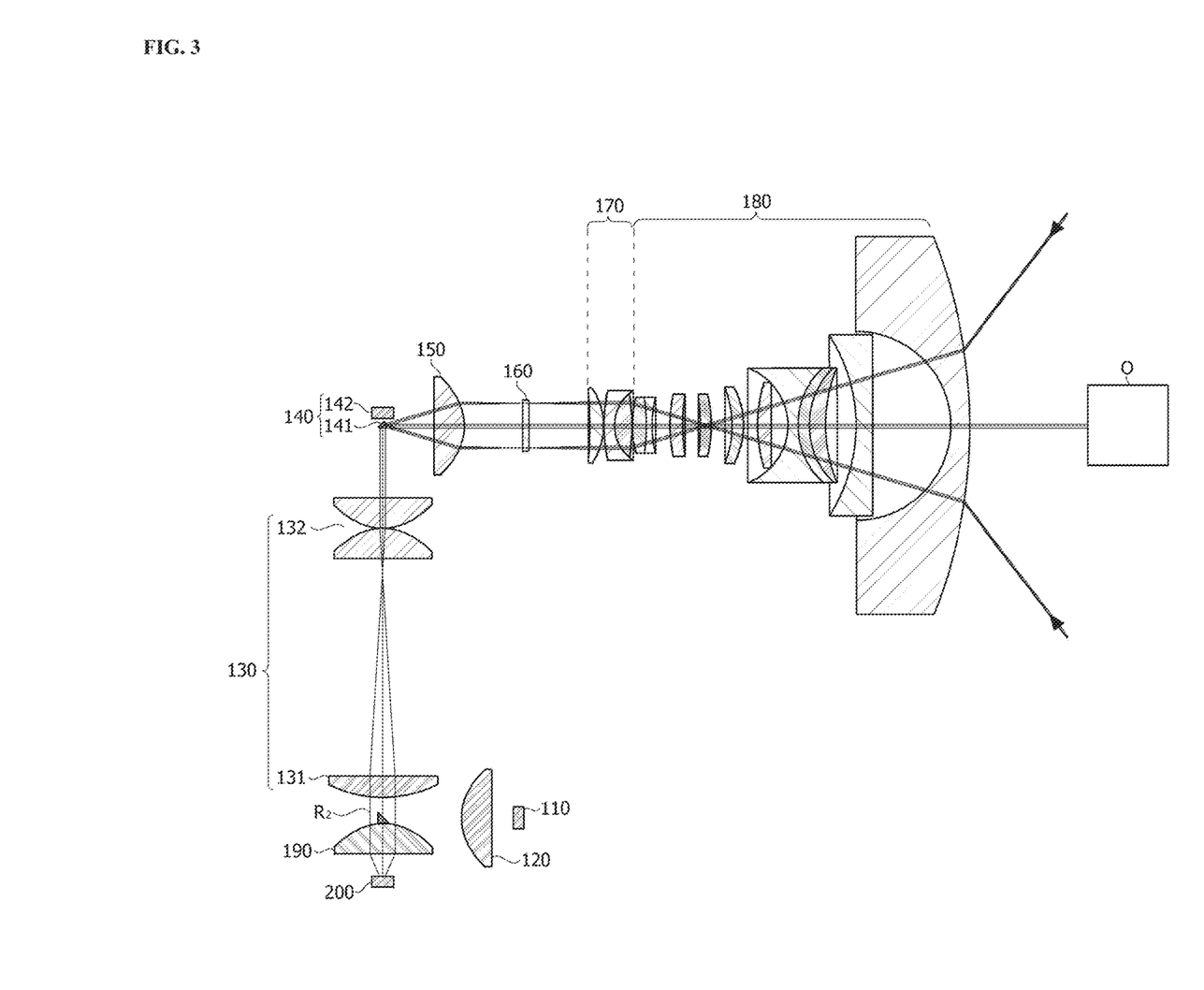
FIG. 3 is a cross-sectional view of an LIDAR device during reception according to an embodiment.

FIG. 1 is an exploded perspective view of an LIDAR device according to an embodiment, FIG. 2 is a cross-sectional view of an LIDAR device during transmission according to an embodiment, and FIG. 3 is a cross-sectional view of an LIDAR device during reception according to an embodiment.

Referring to FIGS. 1 and 2, an LIDAR device 10 according to an embodiment of the present invention may include a transmission unit 110, a first lens unit 120, a first mirror 121, a fifth lens unit 130, a reflection unit 140, a second lens unit 150, a focusing lens 160, a third lens unit 170, a fourth lens unit 180, and a reception unit 200.

First, the transmission unit 110 may output laser pulse light and may include a laser diode (LD). Also, the transmission unit 110 may transmit light having various wavelengths. As an example, light transmitted by the transmission unit 110 may have a wavelength smaller than a radio frequency (RF). Since the transmission unit 110 outputs high light energy through such a configuration, the reception unit 200 may receive reflected light having high energy. Thus, it is possible to obtain spatial information having high resolution. Accordingly, the LIDAR device may be used to utilize 3D spatial information. Hereinafter, the light transmitted by the transmission unit 110 is referred to as a first signal.

The first lens unit 120 may convert a first signal R1 transmitted by the transmission unit 110 into parallel light. For example, the first lens unit 120 may include a collimator lens. Also, parallel light refers to light that has parallel beams on an optical path. Accordingly, the first lens unit 120 may be disposed on an optical path along which light is emitted by the first lens unit 120. However, the present invention is not limited to such a position, and the first lens unit 120 may be disposed on an optical path that is changed by a reflection member being added between the transmission unit 110 and the first lens unit 120 (see FIG. 4B).

The first mirror 121 may be displayed on an optical path of parallel light passing through the first lens unit 120. The first mirror 121 may have a size greater than or equal to an area toward which laser light transmitted by the transmission unit 110 is emitted or an area toward which parallel light converted by the first lens unit 120 is emitted. However, the present invention is not limited thereto.

The first mirror 121 may change the optical path to enable the first signal converted into parallel light by the first lens unit 120 to pass through the reflection unit 140. Also, the first mirror 121 may be positioned such that an optical axis of reflected parallel light is the same as an optical axis of light incident on the reception unit 200 and the sixth lens unit 190.

The first mirror 121 may be disposed to have a region that partially overlaps the sixth lens unit 190. Also, the first mirror 121 may reflect the parallel light toward the reflection unit 140, and the first signal reflected by the first mirror 121 may be the same parallel light as light incident on the first mirror 121.

The fifth lens unit 130 may be disposed on an optical path along which the first signal reflected by the first mirror 121 propagates toward the reflection unit 140. For example, the fifth lens unit 130 may be disposed between the first mirror 121 and the reflection unit 140.

As an example, the fifth lens unit 130 may include a first lens 131 and a second lens 132. The first lens 131 and the second lens 132 may be disposed separately from each other. Parallel light incident on the fifth lens unit 130 may be refracted through the first lens 131 and may have a focal point between the first lens 131 and the second lens 132.

In this case, a distance between the focal point and the first lens 131 may be greater than a distance between the focal point and the second lens 132. According to such a configuration, an incidence area becomes smaller, and thus most of the light may be incident on the reflection unit 140. That is, light incident on the second lens 132 may be more condensed than light passing through the first lens 131. Accordingly, the condensed light may be entirely transferred to the reflection unit 140, thus reducing energy loss. Also, the reflection unit 140 may have a small size due to such condensation. Thus, the LIDAR device 10 according to an embodiment may improve optical efficiency by reducing optical loss.

Also, when light is reflected by an object O, scattered, and incident on the reception unit 200, the light has a wide incidence area in the fifth lens unit 130. Accordingly, it is possible to minimize an area that overlaps an optical path of the first signal transmitted by the transmission unit 110. Thus, it is possible to improve optical efficiency. Also, the first signal passing through the second lens 132, which is parallel light, is incident on the reflection unit 140.

The reflection unit 140 may be disposed on an optical path of the first signal passing through the fifth lens unit 130 and configured to adjust the optical path of the first signal. The reflection unit 140 may reflect the first signal in a direction vertical to a direction in which the first signal propagates toward the reflection unit 140 after passing through the fifth lens unit 130. However, the present invention is not limited to such a reflection angle, and there may be various reflection angles depending on an environment in which the LIDAR device 10 according to an embodiment is applied.

Light incident on the reflection unit 140 and light reflected and output from the reflection unit 140 may be parallel light. The reflection unit 140 may include a microelectromechanical systems (MEMS) mirror. For example, the reflection unit 140 may include a mirror plate 141 and a driving unit 142.

The mirror plate 141 may be tilted at a predetermined angle. The mirror plate 141 may be disposed on the optical path of the first signal passing through the fifth lens unit 130 and configured to reflect the first signal in various directions depending on a tilting angle thereof. The mirror plate 141 may have a size of 1 mm$^2$ to 25 mm$^2$, but the present invention is not limited thereto. Also, the tilting angle of the mirror plate 141 may be up to 20 degrees. In this case, parallel light may be incident on the mirror plate 141, and thus divergence of light is prevented when the light is transmitted or received. Accordingly, it is possible to improve optical efficiency.

In the reflection unit 140, the mirror plate 141 may be tilted at the predetermined angle by operating the driving unit 142. The reflection unit 140 may variously change an optical path of the parallel light by using the driving unit 142.

The mirror plate 141 may be tilted not by a mechanical method but by an electromagnetic force. Since the mirror plate 141 is tilted in the form of a sine wave with respect to time, a sinusoidal spherical aberration generated by the fourth lens unit 180 may be corrected on a time axis.

The second lens unit 150 may be disposed on an optical path of the light reflected by the reflection unit 140. The second lens unit 150 may refract the first signal reflected by the reflection unit 140 to have the same focal plane. As an example, the second lens unit 150 may include an f-theta lens.

The second lens unit 150 may refract the parallel light to form a focal point. Also, light passing through the second lens unit 150 may not be parallel light, but may have a parallel optical path.

The second lens unit 150 may enable light reflected along various paths by the reflection unit 140 to have focal points on the same plane.

For example, the second lens unit 150 may form focal points spaced apart by scanning angles on the same plane.

That is, the first signal incident on the second lens unit 150, which is light reflected by the reflection unit 140, may have as small an optical area as a size of the reflection unit 140. It is possible to maintain very high optical efficiency before the first signal becomes parallel light by increasing the scanning angle. Also, while increasing an angle at which the first signal passing through the reflection unit 140 scans an object, the second lens unit 150 may form focal lengths spaced apart by scanning angles to maintain high optical efficiency. That is, when light passing through the second lens unit 150 is not concentrated on a certain region depending on an angle of the reflection unit 140, the focal lengths may be formed as different displacements without optical loss.

The focusing lens 160 may be disposed on a focal point formed by light passing through the second lens unit 150. Light may be emitted from the focusing lens 160 toward the third lens unit 170 along a parallel optical path. The focusing lens 160 may be disposed between the second lens unit 150 and the third lens unit 170 and may be positioned closer to the second lens unit 150 than to third lens unit 170. Thus, it is possible to improve the scanning angle by increasing an overall angle of light incident on the third lens unit 170.

The third lens unit 170 may convert the first signal passing through the second lens unit 150 back into parallel light. Accordingly, the first signal passing through the third lens unit 170 may be parallel light. The third lens unit 170 may include a telecentric lens.

As described above, the focusing lens 160 may be positioned closer to the second lens unit 150 than the third lens unit 170. Accordingly, the first signal incident on the third lens unit 170 may have a larger area than the first signal emitted from the second lens unit 150.

According to such a configuration, light incident on the second lens unit 150 has a smaller incidence area than light incident on the third lens unit 170. Also, both the light incident on the second lens unit 150 and light passing through the third lens unit 170 may be parallel light, and parallel light incident on the second lens unit 150 may have a larger optical angle than parallel light passing through the third lens unit 170. Also, while the light passing through the third lens unit 170 passes through the fourth lens unit 180, an optical angle thereof may increase to achieve a scanning angle of 150° or more.

The fourth lens unit 180 may be positioned between the object O and the third lens unit 170 and may be disposed on an optical path of the first signal passing through the third lens unit 170. The fourth lens unit 180 may be a wide-angle lens. According to such a configuration, the fourth lens unit 180 may increase an angle of the first signal with respect to an optical axis.

That is, light may form various optical paths depending on various tiling angles, and while the light that forms various optical paths passes through the fourth lens unit 180, an optical angle thereof may increase to achieve a wide scanning range.

As an example, a first sub-signal $R_{1-1}$ may be the first signal R1 in the same axis as the optical axis. The first sub-signal $R_{1-1}$ may be light that is output toward the object O when the tilting angle of the reflection unit 140 is 0 degrees. Also, a second sub-signal $R_{1-2}$ may be the first signal R1 having the largest angle from the optical axis. In this case, the reflection unit 140 may have the maximum tilting angle. As an example, the second sub-signal $R_{1-2}$ may be light that is output toward the object O when the reflection unit 140 is tilted by ±6 degrees.

Referring to FIG. 3, light scattered and refracted by the object O may be incident on the fourth lens unit 180 along the same optical path as the light emitted toward the object O. Hereinafter, light received by the reception unit 200 out of the light scattered and refracted by the object O is referred to as a second signal $R_2$.

The second signal $R_2$ may be incident on the fourth lens unit 180 and may be parallel light. Incident light may be refracted by the third lens unit 170 to form a focal point on the focusing lens 160. Like the first signal R1, a plurality of focal points may be formed on the focusing lens 160 depending on the scanning angle.

The second signal $R_2$ passing through the focusing lens 160 may be incident on the second lens unit 150, and the second lens unit 150 may convert the second signal $R_2$ into parallel light.

Like the first signal R1, the second signal $R_2$ may have a parallel optical path between the second lens unit 150 and the third lens unit 170 and may be parallel light in the optical path except for a portion between the second lens unit 150 and the third lens unit 170.

The second signal $R_2$ may have the same optical path as the first signal R1 as far as the fifth lens unit 130. Also, as described above, the second signal $R_2$ may be coaxial with the first signal R1 on an optical path from the fifth lens unit 130 toward the object O. According to such a configuration, it is possible to improve optical efficiency because a light transmission area and a light reception area are maintained to be constant.

An optical area of the second signal $R_2$ may increase in the fifth lens unit 130. Accordingly, it is possible to decrease a region that overlaps the first mirror 121 and minimize light lost by the first mirror 121 on an optical path along which the second signal is condensed onto the reception unit 200 through the sixth lens unit 190.

The second signal $R_2$ incident to the sixth lens unit 190 may be parallel light while the output second signal $R_2$ may not be parallel light because the second signal $R_2$ is refracted by the sixth lens unit 190. For example, the first lens unit 120 may include a collimator lens. However, the present invention is not limited thereto. The second signal $R_2$ passing through the sixth lens unit 190 may be condensed on the reception unit 200. Finally, the second signal $R_2$ may be incident to the reception unit 200.

The reception unit 200 may receive light transmitted by the transmission unit 110 and reflected or scattered by the object O. The reception unit 200 may be disposed adjacent to the transmission unit 110, and light reflected by the object O may have an optical path that is as coaxial to that of the light transmitted by the transmission unit 110 as possible before the reflected light reaches the transmission unit 110. Thus, the LIDAR device 10 according to an embodiment may improve optical efficiency by reducing optical loss.

The reception unit 200 may transmit a signal corresponding to received laser light to a computing apparatus (now shown). To this end, the LIDAR device 10 may further include a signal processing unit (not shown) for performing signal processing on the received laser light and a communication unit (not shown) for transmitting a signal processed by the signal processing unit.

The computing device (not shown) calculates a distance between the LIDAR device 10 and the object O using the signal received from the LIDAR device 10. As an example, on the basis of a time-of-flight (TOF) method, the computing device (not shown) may calculate the distance between the LIDAR device 10 and the object O using time taken for laser light to be output by the transmission unit 110, reflected by the object O, and then returned to the reception unit 200. Alternatively, on the basis of a phase shift (PS) method, the computing device (not shown) may calculate the distance between the LIDAR device 10 and the object O using a phase of a signal reflected by the object O and returned to the reception unit 200 after laser light that is continuously modulated with a specified frequency is emitted.

Figure 4A:
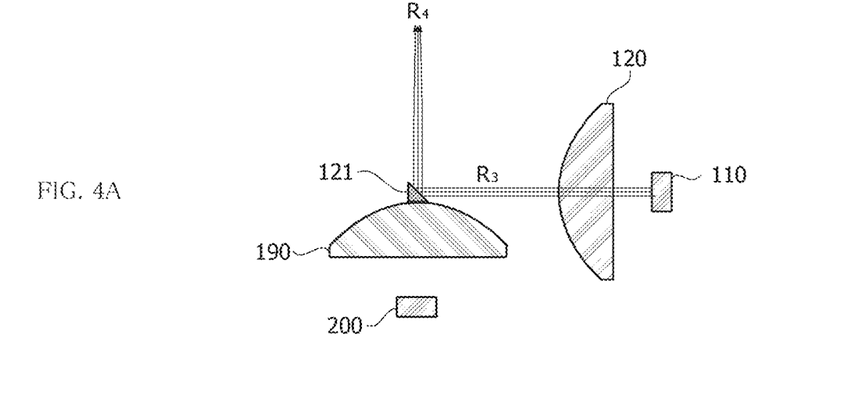
FIG. 4A is a diagram showing a transmission unit and a first lens unit of an LIDAR device according to various embodiments.
Figure 4B:
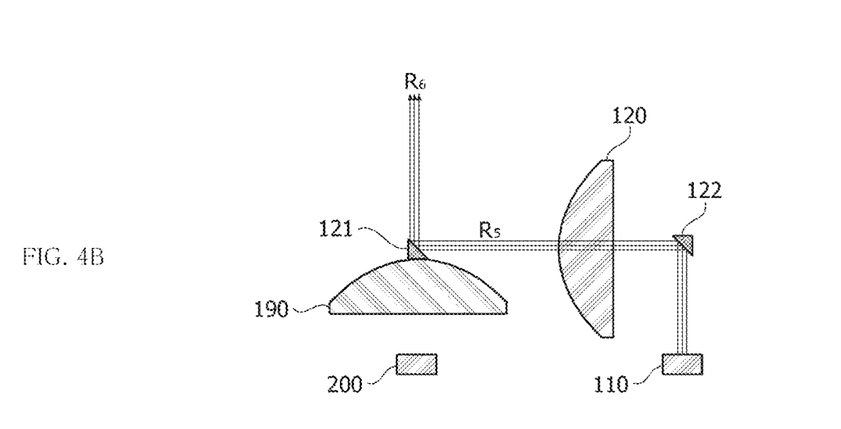
FIG. 4B is another diagram showing a transmission unit and a first lens unit of an LIDAR device according to various embodiments.

FIG. 4A and FIG. 4B are diagrams showing the transmission unit 110 and the first lens unit 120 of the LIDAR device 10 according to various embodiments.

Referring to FIG. 4A, the transmission unit 110 may be disposed so that an optical axis of output laser light is collinear with the first lens unit 120 and the first mirror 121. As an example, a first signal $R_3$ passing through the first lens unit 120, which is parallel light, may be reflected by the first mirror 121 and be incident thereon in a vertical direction. The first mirror 121 may reflect a first signal $R_4$ toward the fifth lens unit 130 or the reflection unit 140 as parallel light. The first signal $R_4$ may have an optical axis that is coaxial with the first mirror 121, a central axis of the sixth lens unit 190, and the reception unit 200.

Referring to FIG. 4B, a first signal transmitted from the reception unit 200 may be reflected by the second mirror 122. A first signal $R_6$ reflected by the second mirror 122 may be parallel light that passes through the first lens unit 120. Also, as described above, the first signal $R_6$ may be reflected by the first mirror 121 and be incident thereon in the vertical length. According to such a configuration, the reception unit 200 and the transmission unit 110 may be coplanar with each other so that a circuit connection therebetween may be facilitated.

Figure 5A:
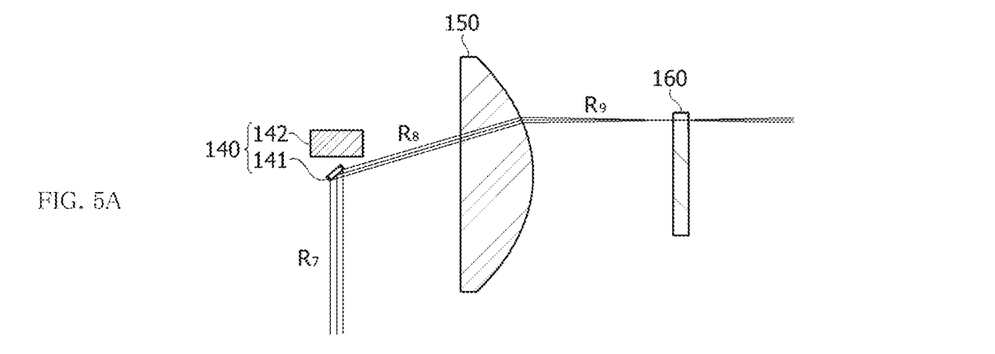
FIG. 5A is a diagram showing a reflection unit, a second lens unit, and a third lens unit of an LIDAR device according to an embodiment.
Figure 5B:
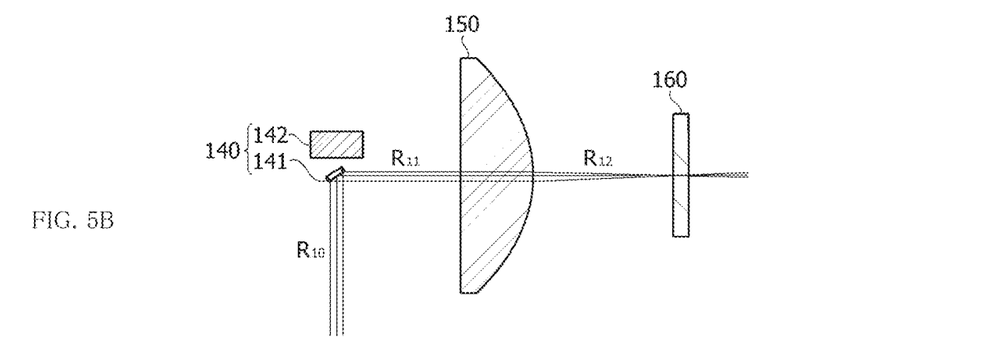
FIG. 5B is another diagram showing a reflection unit, a second lens unit, and a third lens unit of an LIDAR device according to an embodiment.
Figure 5C:
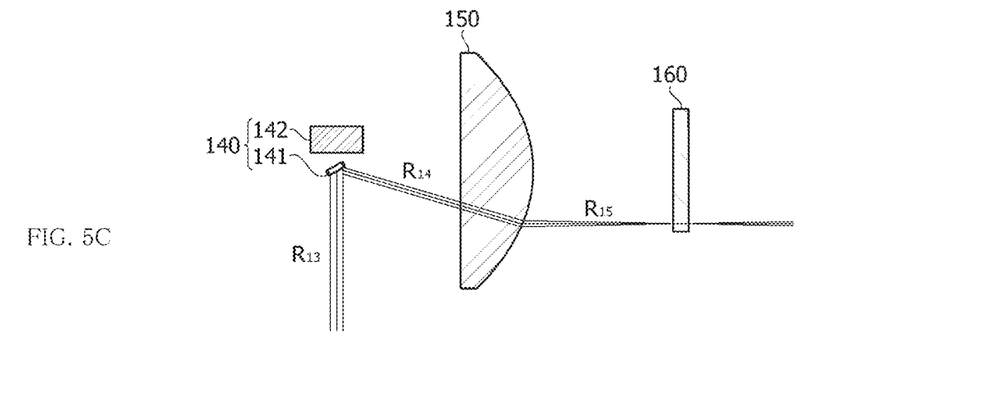
FIG. 5C is yet another diagram showing a reflection unit, a second lens unit, and a third lens unit of an LIDAR device according to an embodiment.

FIG. 5A, FIG. 5B and FIG. 5C are diagrams showing a reflection unit, a second lens unit, and a third lens unit of an LIDAR device according to an embodiment.

Referring to FIGS. 5A to 5C, optical paths of first signals in a case in which the reflection unit 140 is maximally tilted in a positive direction (FIG. 5A), in a case in which the reflection unit 140 is not tilted (FIG. 5B), and in a case in which the reflection unit 140 is maximally tilted in a negative direction (FIG. 5C) are shown.

First signals $R_7$, $R_{10}$, and $R_{13}$ incident on the reflection unit 140 may be reflected toward the second lens unit 150 by tilting the reflection unit 140. First signals $R_8$, $R_{11}$, and $R_{14}$ incident on the second lens unit 150 may have optical paths having different displacements and an angle parallel to the second lens unit 150. Also, first signals $R_9$, $R_{12}$, and $R_{15}$ passing through the second lens unit 150 may be converted to signals having focal points with the same distance. According to such a configuration, light reflected by the reflection unit 140 may be maintained as parallel light and be incident on the second lens unit 150 to have different displacements. Also, the first signal passing through the second lens unit 150 may have the same distance from the second lens unit 150 on the focusing lens 160 (on the same plane) while having different displacements depending on angles of the reflection unit 140. That is, it is possible to enhance the scanning angle by forming a plurality of light beams having different displacements by tilting the reflection unit 140

Figure 6:
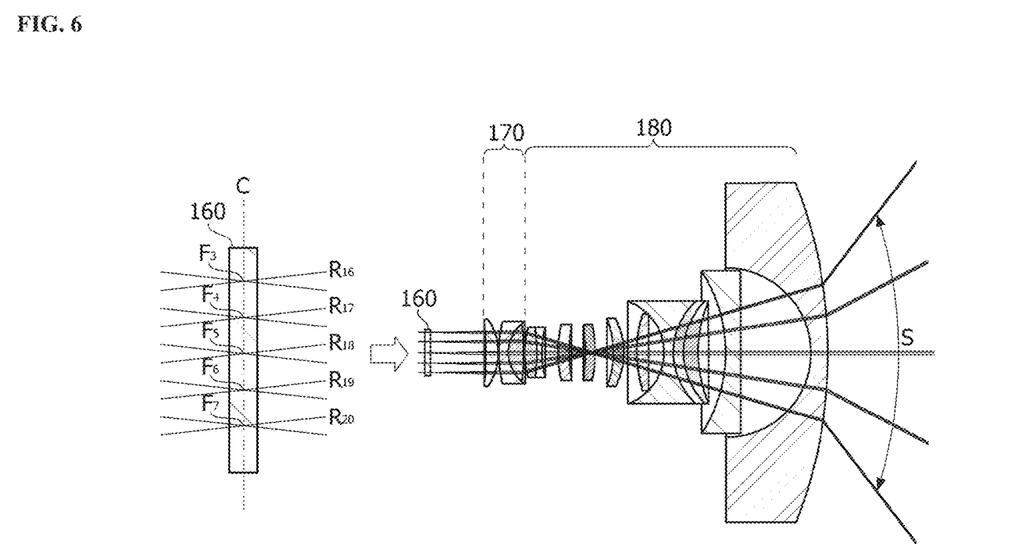
FIG. 6 is a diagram showing a focusing lens and a fourth lens unit according to an embodiment.

FIG. 6 is a diagram showing a focusing lens and a fourth lens unit according to an embodiment.

Referring to FIG. 6, a focusing lens may be formed so that focal points of first signals $R_{16}$, $R_{17}$, $R_{18}$, $R_{19}$, and $R_{20}$ passing through a second lens unit and varying depending on a tilting angle of a reflection unit have different displacements on a first axis C.

The first signals $R_{16}$, $R_{17}$, $R_{18}$, $R_{19}$, and $R_{20}$ may be converted into parallel light after a third lens unit, and optical angles of the first signals may increase in a fourth lens unit. For example, the tilting angle of the reflection unit is within the range of −6 to 6 degrees, and an entire angle at which the first signals passing through the fourth lens are output toward an object may be 150 degrees or higher. Thus, a scanning angle S may be 150 degrees or more. According to such a configuration, it is possible to greatly improve the scanning angle using a reflection unit including an ultra-compact MEMS mirror. Also, the first signal may be maintained as parallel light even when the first signal is reflected by the reflection unit and increased in angle by the fourth lens unit. Thus, the first signal and a second signal may form an overall coaxial axis. According to the LIDAR device according to an embodiment, it is possible to significantly improve optical efficiency. In addition, it is possible to manufacture a small LIDAR device, and it is also possible to remove errors caused by abrasion and a gap because there is no mechanical rotation.

Figure 7:
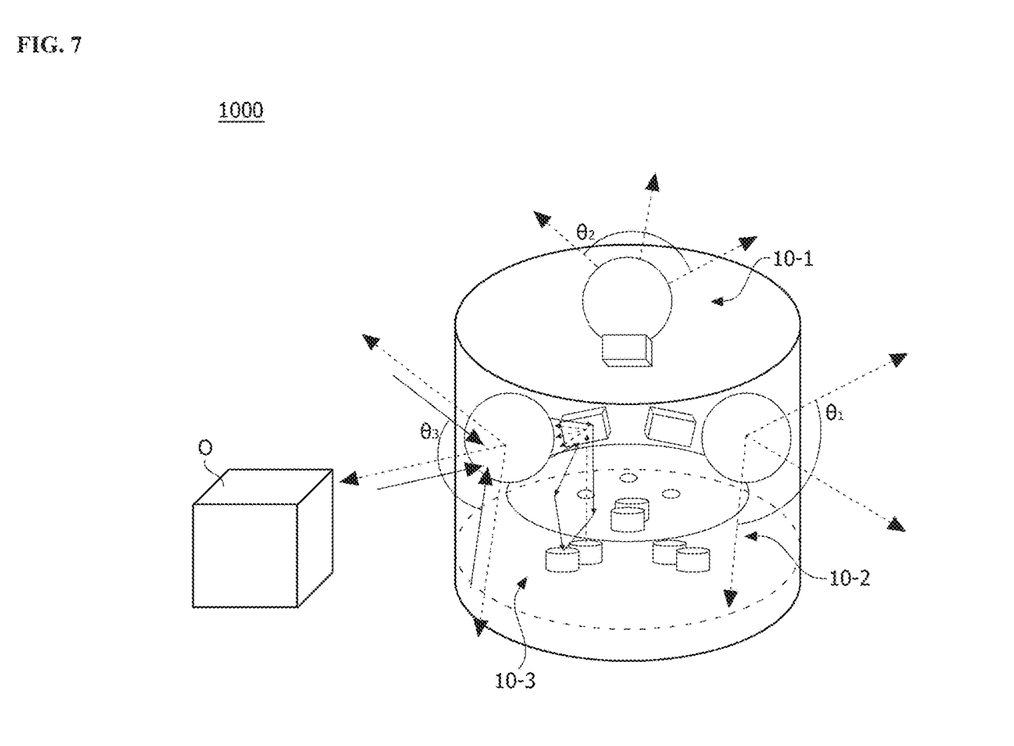
FIG. 7 is a diagram showing an LIDAR system according to an embodiment.

FIG. 7 is a diagram showing an LIDAR system according to an embodiment.

Referring to FIG. 7, an LIDAR system 1000 according to an embodiment may include a plurality of LIDAR devices 10-1, 10-2, and 10-3. The LIDAR system 1000 may include the plurality of LIDAR devices 10-1, 10-2, and 10-3 and scan 360 degrees in all directions.

For example, the LIDAR system 1000 may include three LIDAR devices 10-1, 10-2, and 10-3. Each of the LIDAR devices 10-1, 10-2, and 10-3 may scan angles $\theta_1$, $\theta_2$, and $\theta_3$ of 120 degrees except for overlapping regions. According to such a configuration, it is possible to individually control the LIDAR devices 10-1, 10-2, and 10-3 and perform signal processing, and it is also possible to provide benefits in terms of a small size, low power consumption, and a low cost.

Figure 8:
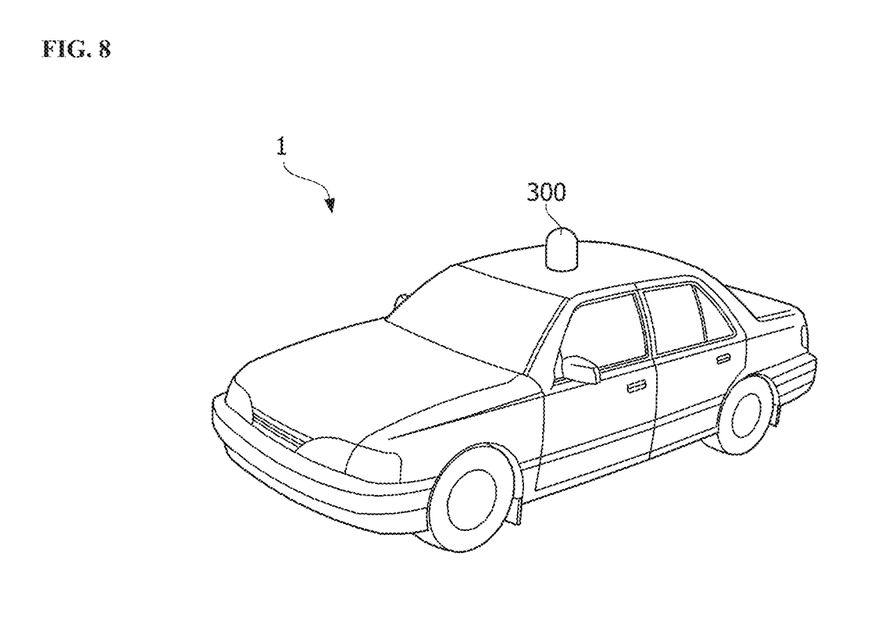
FIG. 8 shows an example in which an LIDAR device is installed on a vehicle according to an embodiment of the present invention.

FIG. 8 shows an example in which an LIDAR device is installed on a vehicle according to an embodiment of the present invention.

Referring to FIG. 8, an LIDAR device 300 according to an embodiment of the present invention may be installed on top of a main body of a vehicle and configured to scan 360 degrees in all directions.

According to an embodiment, it is possible to implement an LIDAR device applicable to a vehicle or a mobile device.

It is also possible to manufacture an LIDAR device with enhanced optical efficiency and an improved scanning angle.

It is also possible to manufacture an LIDAR device with a small size, a light weight, and improved durability.

It is also possible to manufacture an LIDAR device configured to scan a space by using only an optical configuration without mechanical rotation to compensate for mechanical defects.

Various advantageous effects of the present invention are not limited thereto, and should be easily understood by the above description of exemplary embodiments of the present invention.

While the present invention has been described with reference to exemplary embodiments, it should be understood that the invention is not limited to the disclosed exemplary embodiments. It should be understood by those skilled in the art that various changes and applications which are not illustrated in the above descriptions may be made therein without departing from essential characteristics of the embodiments. For example, each element that is specifically shown in the embodiments may be modified and implemented. Therefore, differences related to modifications and applications should be construed as falling within the scope of the present invention as defined by the appended claims.

What is claimed is:

1. A light detection and ranging (LIDAR) device comprising:
   a transmission unit configured to emit a first signal, which is an optical signal;
   a first lens unit configured to convert the first signal into parallel light;
   a reflection unit configured to adjust a direction of the converted first signal toward a subject;
   a second lens unit configured to enable the first signal to have a same focal plane even when a reflection angle of the reflection unit changes;
   a third lens unit configured to convert the first signal passing through the second lens unit into parallel light;
   a fourth lens unit configured to increase an angle of the first signal passing through the third lens unit;
   a reception unit configured to receive a second signal, which is the first signal reflected by an object after passing through the fourth lens unit;
   a fifth lens unit disposed between the first lens unit and the reflection unit; and
   a sixth lens unit disposed between the fifth lens unit and the reception unit; and
   a first mirror disposed to at least partially overlap the sixth lens unit,
   wherein the fourth lens unit, the third lens unit, the second lens unit, the reflection unit, the fifth lens unit, and the sixth lens unit are disposed in this order on an optical path of the second signal,
   wherein the optical path of the second signal is configured to have a first cross-sectional area when the second signal enters the fifth lens unit and a second cross-sectional area greater than the first cross-sectional area when the second signal leaves the fifth lens unit, wherein the second cross-sectional area at least partially overlaps the first mirror along the optical path of the second signal, and wherein a width of the second cross-sectional area is greater than a width of the first mirror.

2. The LIDAR device of claim 1, wherein the first signal and the second signal are parallel to each other between the reflection unit and the second lens unit and between the third lens unit and the object.

3. The LIDAR device of claim 1, wherein the second signal has the same optical path as the first signal between the reflection unit and the fourth lens unit.

4. The LIDAR device of claim 1, further comprising a focusing lens positioned in the same focal plane.

5. The LIDAR device of claim 1, wherein the reflection unit corrects an optical aberration caused by a focal displacement between the same focal plane and the third lens unit.

6. The LIDAR device of claim 5, wherein the reflection unit controls adjustment of the reflection angle to correct the optical aberration.

7. The LIDAR device of claim 1, wherein the reflection unit includes a microelectromechanical systems (MEMS) mirror.

8. The LIDAR device of claim 1, wherein the first signal and the second signal overlap in at least some regions.

9. The LIDAR device of claim 8, further comprising an optical diffusing unit configured to control a beam size of the first signal between the reflection unit and the first lens.

* * * * *